United States Patent
Farrow

(10) Patent No.: US 6,342,686 B1
(45) Date of Patent: Jan. 29, 2002

(54) METHOD FOR DETERMINING A CONDITION OF A RESISTANCE SPOTWELDING SYSTEM OR A WORKPIECE IN THE SYSTEM

(75) Inventor: John F. Farrow, Plymouth, MI (US)

(73) Assignee: Medar, Inc., Farmington Hills, MI (US)

( * ) Notice: Subject to any disclaimer, the term of this patent is extended or adjusted under 35 U.S.C. 154(b) by 0 days.

(21) Appl. No.: 09/709,891

(22) Filed: Nov. 9, 2000

Related U.S. Application Data

(62) Division of application No. 09/318,307, filed on May 25, 1999, now Pat. No. 6,225,590.

(51) Int. Cl.$^7$ .............................................. B23K 11/25
(52) U.S. Cl. .................................. 219/109; 219/86.41
(58) Field of Search ................................. 219/109, 110, 219/86.41, 86.51, 86.7

(56) References Cited

U.S. PATENT DOCUMENTS

| 3,345,493 A | 10/1967 | Quettel et al. |
| 4,104,724 A | 8/1978 | Dix et al. |
| 4,670,641 A | 6/1987 | Porsander et al. |
| 4,885,451 A | 12/1989 | Farrow et al. |
| 5,083,003 A | 1/1992 | Clark, Jr. et al. |
| 5,340,960 A | 8/1994 | Takasaki et al. |
| 5,386,096 A | 1/1995 | Buda et al. |
| 5,405,075 A | 4/1995 | Narita et al. |
| 5,449,877 A | 9/1995 | Buda et al. |
| 5,510,593 A | 4/1996 | Sakai |
| 5,582,747 A | 12/1996 | Sakai et al. |
| 5,742,022 A | 4/1998 | Crawford et al. |
| 5,883,355 A | * 3/1999 | Kaneshima .............. 219/86.51 |
| 5,906,755 A | 5/1999 | Arasuna et al. |

OTHER PUBLICATIONS

R.L. O'Brien, Welding Handbook, Welding Processes, Chapter 17, Spot, Seam, and Projection Welding, Chapter 19, Resistance Welding Equipment, 8$^{th}$ ed., vol. 2, 1991.

* cited by examiner

Primary Examiner—Clifford C. Shaw
(74) Attorney, Agent, or Firm—Brooks & Kushman P.C.

(57) ABSTRACT

This invention relates to methods to control the resistance spotwelding process using an electric servomotor actuator to move the welding electrodes to the work and apply force to them. Measurements of actuator position, servomotor drive voltage, servomotor drive current, voltage across the welding electrodes, welding transformer primary current, welding transformer secondary current and power factor in the primary circuit of the welding transformer are used separately and in combination to determine various conditions such as identify defects in the welding machine, the electric cabling, the welding process and in the weld itself. Depending upon the defect found, the welding parameters are changed to overcome the defect, and/or the need for an additional weld is indicated and/or an error indication is generated.

49 Claims, 2 Drawing Sheets

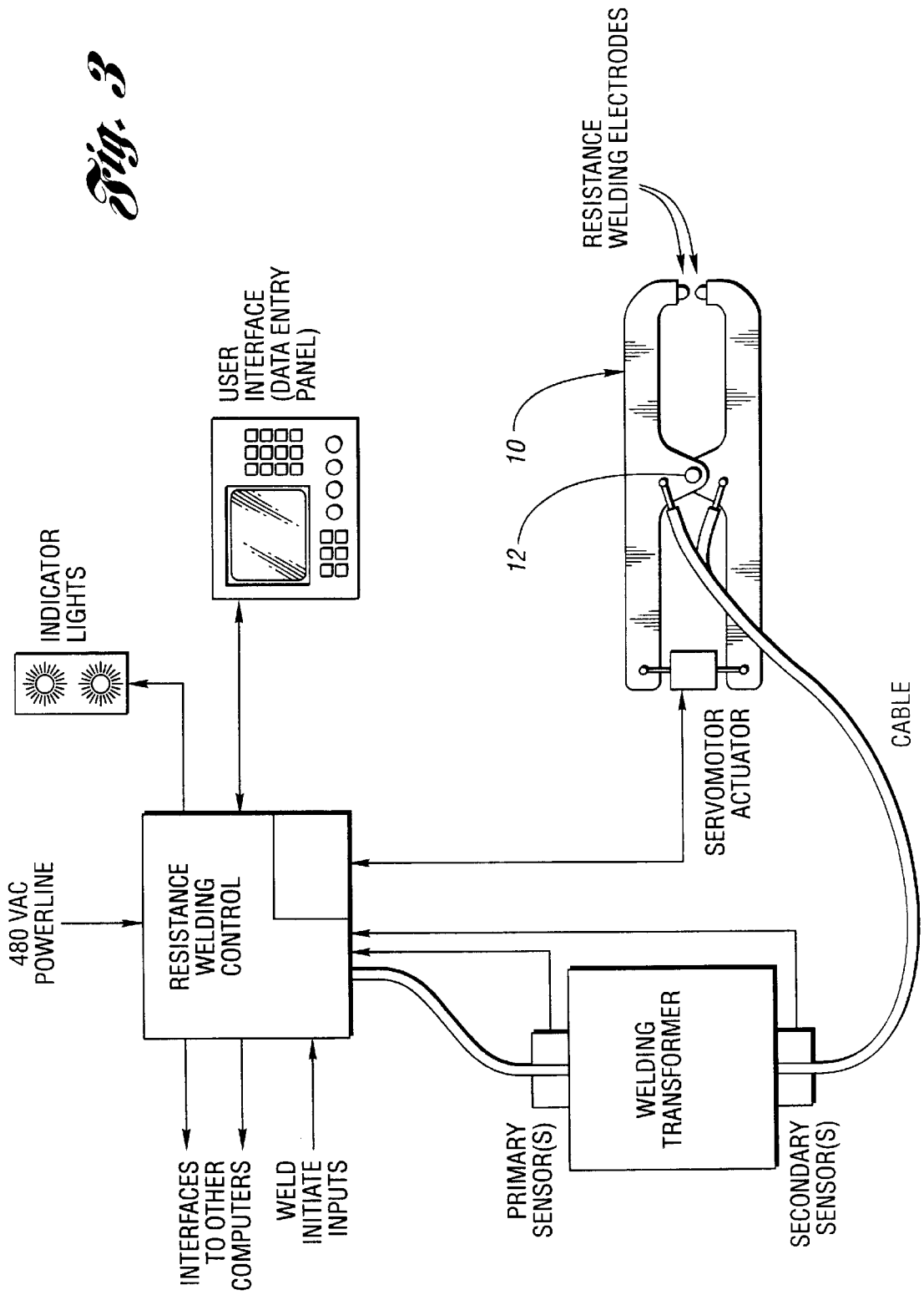

METHOD FOR DETERMINING A CONDITION OF A RESISTANCE SPOTWELDING SYSTEM OR A WORKPIECE IN THE SYSTEM

This is a continuation divisional of application(s) Ser. No. 09/318,307 filed on may 25, 1999 now U.S. Pat. No. 6,225,590.

TECHNICAL FIELD

This invention relates to methods for determining a condition of a resistance spotwelding system or a workpiece in the system and, in particular, to methods for determining a condition of a resistance spotwelding system or a workpiece in the system, the system including an electric servomotor used to move welding electrodes together and apply a clamping force to the welding electrodes.

BACKGROUND ART

A relatively new kind of actuator, called a servomotor actuator, may replace a pneumatic cylinder commonly found on resistance spotwelding machines. It is useful to understand the prior art of resistance spotwelding and in particular the apparatus used to do resistance spotwelding. Reference is made to Chapters 17 and 19 of the eighth edition of the WELDING HANDBOOK.

The difference between a conventional resistance spotwelding welding machine and a servomotor-actuated welding machine is the means by which force is applied to the welding electrodes. Instead of a pneumatic cylinder to supply the force, an electric servomotor is used. In order to supply the required force, on the order of 1000 LBS, with a motor small enough to be practical, the servomotor is usually used to drive gearing in the form of a screw or a nut which then supplies the force to the welding electrodes.

The servomotor is controlled by an electronic servo drive, which regulates the current into the motor to regulate its torque and thus the clamping force on the welding electrodes. In addition to controlling torque (and therefore electrode force), the electronic servo drive also measures the position of the motor and/or the screw it drives so it can control both motor speed and position. Thus, a servomotor-actuated welding machine has the capability to position its welding electrodes precisely anywhere between fully closed and fully open positions. In addition, a servomotor-actuated welding machine has the capability to move the welding electrodes at a particular velocity and to measure changes in force as a function of position.

As illustrated in FIG. 2, a servo system traditionally includes a compensator which takes the desired response (usually in terms of a position or velocity of a motor) and compares it to that measured by a sensing system. Based on this measurement, a new input for the motor is calculated. The compensator may be implemented with either analog or digital computing hardware. Since the compensator consists of computing electronics, it rarely has sufficient power to drive the motor directly. Consequently, the compensator's output is used to command a power stage. The power stage amplifies that signal and drives the motor. There are a number of motors that can be used in servo systems such as DC motors, brushless DC motors, and hybrid stepping motors. To achieve a mechanical advantage, the motor shaft is usually connected to gearing or gears that move the actual load. The performance of the motor is measured by either a single sensor or multiple sensors. Two common sensors, a tachometer (for velocity) and an encoder (for position), are shown. Finally, those measurements are fed back to the compensator.

The servomotor-actuated resistance welding machine itself is not an object of this invention and little explanation of its internal operation is given herein. For information on how a servomotor-actuated resistance spotwelding machine works, refer to U.S. Pat. Nos. 4,670,641; 5,340,960; 5,405,075 and 5,742,022. These patents discuss the operation of a resistance spotwelding gun, which is a type of resistance spotwelding machine. The general principles described therein apply to all types of resistance spotwelding machines.

It is usually desirable, for economic reasons, to speed up the resistance spotwelding process as much as possible. A significant portion of the time required for welding is called "Squeeze time". As the welding gun is closed on the workpiece, squeeze time is the time interval allowed for the welding gun to close and build up force on the welding electrodes. When a pneumatic cylinder is used to supply the force on the welding electrodes, the squeeze time can vary widely due to changes in the incoming plant air supply pressure. Also, it is difficult to measure exactly when the force on the welding electrodes has actually reached the proper value. Friction and inertia of the cylinder and welding gun make measurements of air pressure in the cylinder unreliable to determine when welding force has reached a proper value. A load cell to measure the actual force on the welding electrodes is expensive, fragile, and unreliable.

Therefore, usual practice is to use a fixed squeeze time to allow the welding electrodes to close and attain proper welding force. If this time is set too low, inconsistent welds result. If it is set too high, production speed is slowed.

As many spot welds are made, wear on the welding electrode faces occurs. Depending upon the material being welded, this wear occurs in various ways. With welding materials such as aluminum, the faces of the electrodes contacting the weld area wear down, and due to the generally conical or spherical shape of the welding electrodes, the contact area of the electrodes to the work increases. As this happens, the current and force required for an optimum weld increase, since the larger contact area spreads both the current and applied force over a larger area.

In other material, such as galvanized steel, welding electrode wear occurs differently. Since the zinc coating of galvanized steel has an affinity for copper and the temperature required for welding steel is considerably above the melting point of zinc, the zinc on the part in the weld area forms an alloy (brass) on the surfaces the copper welding electrode which contact the part being welded. As the first few welds are made with new electrodes, the electrodes actually get slightly longer (they "grow" by a few thousandths of an inch) as this zinc accumulates and alloys with the copper. As more welds are made and the brass layer gets thicker, the brass on the faces of the welding electrodes is softened by the heat of the welding process and extrudes out to the sides of the contact faces of the welding electrodes. This has the effect of both increasing the contact area of the electrodes on the surface of the part and wearing the electrode down. Both of these effects increase the current and force required for an optimum weld.

The usual method of compensating for electrode wear is with a "weld current stepper". A weld current stepper is a feature of the welding control wherein the welding current is increased (or, in special cases decreased) to compensate for welding electrode wear and deterioration. One way to implement a weld current stepper is to have the control keep track of the number of welds made and increase (or in some special cases, decrease) the welding current according to the number of welds made. Another method of implementing a weld current stepper is to use electrical measurements to identify events during the welding process and increase or decrease the welding current in response to these events. See U.S. Pat. Nos. 4,104,724; 4,885,451; 5,083,003; 5,386,096 and 5,449,877 for more information in this area.

The present methods of implementing a weld current stepper all have drawbacks and shortcomings. The rate at which welding electrodes wear or deteriorate varies tremendously due to variations in the metal being welded, variations in the electrodes themselves, adequacy of cooling water to the electrodes, and a host of other factors. From one day to the next, the rate at which welding electrodes deteriorate or wear can change by a factor of more than 2. Methods of simply counting welds are clearly inadequate to compensate for these variations. Other methods which measure electrical phenomena to implement a weld current stepper base decisions on effects caused partially by welding electrode wear and partially by other factors, such as material variations. These other factors cause the weld current stepper to respond to things other than wear or deterioration of the welding electrodes, which results in increased process variation.

If a weld is made at the very edge of a part, and only a small portion of the electrode faces are actually in contact with the part, severe weld expulsion will occur and the faces of the welding electrodes may be damaged. During this weld, the electrical measurements taken by the welding control can identify weld expulsion (See U.S. Pat. No. 4,885,451 for an explanation of how this is done).

DISCLOSURE OF INVENTION

An object of the present invention is to provide a method for determining a condition of a resistance spotwelding system or a workpiece in the system to overcome some of the problems which occur when resistance spotwelding sheet material together.

Another object of the present invention is to provide a method for determining a condition of a resistance spotwelding system or a workpiece in the system and, in response, change parameters of the welding process itself or identify problems to a welding machine operator.

It is another object of the present invention is to provide a method for determining a condition of a resistance spotwelding system or a workpiece in the system to improve control of the spotwelding process.

Still another object of the present invention is to provide a method for determining a condition of a resistance spotwelding system or a workpiece in the system to detect excess friction in a welding machine of the system such as a welding gun.

Yet another object of the present invention is to provide a method for determining a condition of a resistance spotwelding system or a workpiece in the system to allow welding electrode wear to be measured more directly.

Another object of the present invention is to provide a method for determining a condition of a resistance spotwelding system or a workpiece in the system to identify welding problems and reduce process variation.

In carrying out the above objects and other objects of the present invention, a method is provided for determining a condition of a resistance spotwelding system or a workpiece in the system, the system includes a welding transformer, a welding machine, a pair of welding electrodes supported for movement by the welding machine and an electric servomotor adapted to receive electrical inputs to rotate a drive shaft of the servomotor to, in turn, move the welding electrodes together and apply a force to the welding electrodes. The method includes sensing a change in at least one of the electrical inputs and providing at least one signal in response thereto. The method also includes processing the at least one signal to determine the condition.

The condition may be whether the welding electrodes have contacted either the workpiece to be welded or, in the absence of a workpiece, each other.

The at least one of the electrical inputs may be voltage across the servomotor. The method may include sensing changes in current through the welding transformer and generating a corresponding current signal in response thereto. The step of processing processes the at least one signal and the current signal to determine the condition.

The method may include sensing changes in voltage across the welding electrodes and providing a voltage signal in response thereto. The step of processing processes the voltage signal together with the at least one signal to determine the condition.

The at least one of the electrical inputs may be current through the servomotor. The method may include sensing changes in welding transformer current and providing a corresponding current signal in response thereto. The step of processing processes the current signal together with the at least one signal to determine the condition.

The method may include sensing changes in voltage across the welding electrodes and providing a corresponding voltage signal in response thereto. The step of processing then processes the voltage signal together with the at least one signal to determine the condition.

When the electrical inputs are voltage across the servomotor and current through the servomotor, the step of sensing may include the step of sensing changes in both the voltage and the current to provide corresponding voltage and current signals in response thereto. The step of processing processes both of the voltage and current signals to detect that the welding electrodes have contacted either the workpiece to be welded or, in the absence of a workpiece, each other.

The method may include sensing a change in welding transformer current and providing a corresponding transformer current signal in response thereto. The step of processing processes the transformer current signal together with the current and voltage signals to determine the condition.

The method may include sensing a change in voltage across the welding electrodes and providing a corresponding electrode voltage signal in response thereto. The step of processing processes the electrode voltage signal together with the current and voltage signals to determine the condition.

When the condition is a value for mechanical friction of the welding machine as the welding electrodes are closed on each other. The electrical inputs are voltage across and current through the servomotor wherein the step of sensing senses changes in both the voltage and the current to provide corresponding voltage and current signals in response thereto. The step of processing processes the voltage and current signals to determine the value. The method may then further include displaying the value.

The method may further include comparing the value to predetermined limits and producing an error signal when the value is outside the predetermined limits.

The condition may be that the force on the welding electrodes has reached a desired value. The at least one of the electrical inputs may then be voltage across the servomotor. The method may then further include positioning a workpiece between the welding electrodes and applying a welding current to the welding electrodes after determining the condition.

The at least one of the electrical inputs may be current through the servomotor. The method may then further include positioning a workpiece between the welding electrodes and applying a welding current to the welding electrodes after determining the condition.

Both voltage across the servomotor and current through the servomotor may be sensed in the step of sensing and corresponding current and voltage signals provided in response thereto. Both the current and voltage signals are processed in the step of processing to determine the condition. The method may then further include positioning a workpiece between the welding electrodes and applying a welding current to the welding electrodes after determining the condition.

Still further in carrying out the above objects and other objects of the present invention, a method is provided for determining a condition of a resistance spot welding system or a workpiece in the system. The system includes a welding transformer, a welding machine, a pair of welding electrodes supported for movement by the welding machine and an electric servomotor adapted to receive electrical inputs to rotate a drive shaft of the servomotor to, in turn, move the welding electrodes together and apply a force to the welding electrodes. The method includes sensing rotary position of the drive shaft and providing a feedback signal in response thereto. The method also includes processing the feedback signal to determine the condition.

The condition may be a position of the servomotor which corresponds to the welding electrodes being fully in contact with each other without a workpiece between them.

The method may further include positioning at least one workpiece between the welding electrodes wherein the condition is thickness of an area where a weld is desired on the workpiece. The method may further include changing welding parameters of the system based on the thicknesses. The method may further include comparing the thickness to predetermined limits and alerting an operator of the system when the thickness is outside the predetermined limits.

The method may further include positioning a pair of workpieces between the welding electrodes and increasing the force on the welding electrodes. The condition is at least one gap between the workpieces. The steps of sensing and processing are also performed to measure movement of the welding electrodes after the welding electrodes are closed and after the force on the welding electrodes is changed. The method may further include further increasing the force on the welding electrodes to close the at least one gap.

The method may further include positioning at least one workpiece between the welding electrodes and applying welding current to the welding electrodes wherein the steps of sensing and processing are performed as the welding current is applied. The condition may be the absence of a workpiece between the welding electrodes or wear of the welding electrodes.

The condition may be a welding condition which may damage the welding electrodes. The method then further includes positioning at least one workpiece between the welding electrodes, applying a welding current to the welding electrodes and generating at least one electrical signal based on the welding current. The step of processing processes the feedback signal and the at least one electrical signal to determine the condition.

The method may further include positioning a workpiece between the welding electrodes and applying a welding current to the welding electrodes to form a weld wherein the condition is welding electrode indentation into the weld. If the condition is electrode wear, the method may further include adjusting a weld current stepper based on the wear, changing weld current magnitude based on wear, changing weld current duration based on the wear, changing force applied to the welding electrodes based on the wear, or producing an indication when the wear exceeds a predetermined limit.

The condition may be thickness of a workpiece being welded. In this case, the method further includes positioning the workpiece between the welding electrodes, applying a welding current to the welding electrodes to form a weld on the workpiece at a first location, moving the welding electrodes relative to the workpiece to a second location on the workpiece, applying a welding current to the welding electrodes at the second location, performing the steps of sensing and processing to obtain a second thickness, computing a moving average of the weld thicknesses and using the moving average of weld thicknesses to infer an amount of wear of the welding electrodes.

The condition may be apparent change in a fully closed position of the welding electrodes caused by electrode replacement or electrode cleaning.

In the case of electrode replacement, the method may further include resetting a weld current stepper based on the apparent change. The method may further include producing an indication that a weld current stepper needs to be reset based on the apparent change.

In the case of electrode cleaning, the method may further include producing an indication that a weld current stepper needs to be reset based on the apparent change. The method may further include partially canceling a welding current increase caused by a weld current stepper based on the apparent change.

The method may further include positioning a workpiece between the welding electrodes wherein the condition is that the welding electrodes are not making contact with the workpiece. The method further includes energizing the welding transformer at a relatively low power level.

In this case, the method further includes causing an error indication if, while the welding electrodes are not making contact with the workpiece, current in the welding transformer is above a first predetermined value. The method may further include measuring voltage across the welding electrodes and causing an error indication if, while the welding electrodes are not making contact with the workpiece, current in the welding transformer is above a first predetermined value and voltage across the welding electrodes is below a second predetermined value.

The method may further include activating the servomotor to bring the welding electrodes together. In this case, the method may further include verifying that, before the welding electrodes make contact with the workpiece, current in the welding transformer is below a third predetermined value. The method may further include measuring the voltage across the welding electrodes and verifying that, before the welding electrodes make contact with the workpiece, current in the welding transformer is below a third predetermined value and the voltage across the welding electrodes is above a fourth predetermined value.

The method may further include causing an error indication if, before the welding electrodes make contact with the workpiece, current in the welding transformer is above a first predetermined value. In this case, the method may further include measuring changes of power factor in a primary circuit of the welding transformer to obtain measurements and utilizing the measurements to infer location of a short circuit which causes the current in the welding transformer to be above the first predetermined value.

The method may further include causing an error indication if, before the welding electrodes make contact with the workpiece, voltage across the welding electrodes is below a second predetermined value. In this case, the method may further include measuring changes of power factor in a primary circuit of the welding transformer to obtain measurements and utilizing the measurements to infer location of a short circuit which causes the voltage across the welding electrodes to be below the second predetermined value.

The method may further include measuring the voltage across the welding electrodes to obtain a voltage measurement and causing an error indication if, before the welding electrodes have made contact with the workpiece, current in the welding transformer is above a first predetermined value and the voltage measurement is below a second predetermined value. In this case, the method may further include measuring changes of power factor in a primary circuit of the welding transformer to obtain measurements and utilizing the measurements to infer location of a short circuit which causes the current in the welding transformer to be above the first predetermined value and the voltage measurement to be below the second predetermined value.

The method may further include measuring power factor in a primary circuit of the welding transformer to obtain a measurement and causing an error indication if, before the welding electrodes have made contact with the workpiece, the measurement is outside predetermined upper and lower limits. In this case, the method may further include utilizing the measurement to infer location of a short circuit which causes the power factor in the primary circuit of the welding transformer to be outside of the predetermined upper and lower limits.

The method may further include causing an error indication if, after the welding electrodes have made contact with the workpiece, current in the welding transformer is not above a predetermined value. The method may further include measuring voltage across the welding electrodes to obtain a voltage measurement and causing an error indication if, after the welding electrodes have made contact with the workpiece, the current in the welding transformer is not above a predetermined value or the voltage measurement is not below a predetermined value.

The method may further include positioning a workpiece between the welding electrodes and applying a welding current to the welding electrodes to make a weld to the workpiece wherein the steps of sensing and processing are performed to determine indentation of the welding electrodes into the workpiece during application of the welding current. In this case, the method may further include terminating the welding current based on the indentation, measuring electrical signals based on the welding current during application of the welding current and terminating the weld current based on the indentation and the electrical signals, identifying weld expulsion based on the indentation, measuring electrical signals based on welding current during application of the welding current and identifying weld expulsion based on indentation and the electrical signals, or determining when to release the welding electrodes from the weld based on the indentation.

The method may further include positioning the workpiece between the welding electrodes and applying a welding current to the welding electrodes wherein the steps of sensing and processing are performed to determine the condition in which the welding electrodes have stuck to the workpiece as the welding electrodes are being removed from the workpiece after application of the welding current. The method may further include positioning a workpiece between the welding electrodes and applying a welding current to the welding electrodes wherein the steps of sensing and processing are performed to determine the condition in which the welding electrodes have stuck to the workpiece as the welding electrodes are being removed from the workpiece after application of the welding current. In this case, the at least one of the electrical inputs is voltage across or current through the servomotor. Alternatively, the step of sensing senses changes in both voltage across the servomotor and current through the servomotor and both the voltage and current signals are processed in the step of processing to determine the condition.

The capabilities of the servomotor-actuated welding machine to measure and control welding electrode force and position allow the welding controller to gain information that is useful to control the resistance spotwelding process. Although the example of a servomotor actuator on a portable resistance spotwelding gun, one of many types of resistance spotwelding machines, is used herein, the methods of this invention are applicable to any resistance spotwelding machine which uses a servomotor actuator to bring the welding electrodes together and apply force to them.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a schematic view of a resistance spotwelding system constructed in accordance with the present invention wherein a resistance welding control contains circuitry needed to drive the servomotor.

BEST MODE FOR CARRYING OUT THE INVENTION

Figure 1:
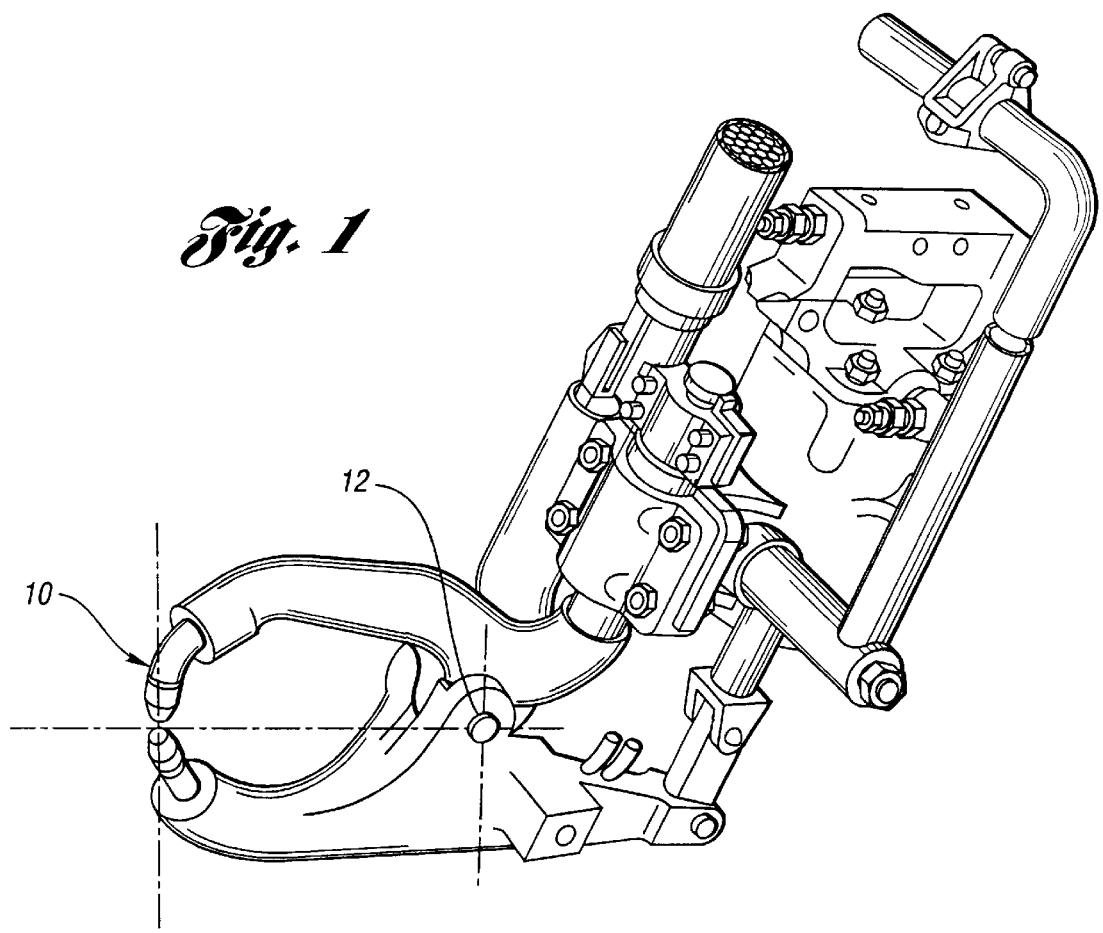
FIG. 1 is a schematic view of a typical resistance spot-welding gun with a servomotor actuator.

An example of a structure needed to perform the methods of this invention is illustrated in FIG. 3. In FIG. 3, a resistance welding control, containing a microprocessor and communications links to other computers, is used to both control a servomotor actuator of a resistance spotwelding gun 10 and the level of current through the weld. Since the configuration of FIG. 3 represents a relatively simple example of the structure needed to perform the methods of this invention, the structure shown in FIG. 3 will be used to explain the methods of this invention. Other possible structures include any type of resistance welding machine which uses an electric servomotor actuator to bring the welding electrodes together and apply force to them. In addition, other possible structures include other control apparatus wherein the servomotor actuator is controlled by a device separate from the welding control, such as a robot, a computer, or some sort of machine control. However, no matter what structure is used, the methods of this invention remain the same.

Knowing the position of the contacting face of the welding electrodes as the welding gun is closed is important to identify several common resistance spotwelding problems. Since new resistance spotwelding welding electrodes vary in size and the electrodes wear away as welds are made, a calibration procedure is necessary to identify the position of the servo actuator which corresponds to the electrodes fully closed.

This calibration is performed by closing the welding gun without a part present. Confirmation that the electrodes are actually touching is obtained in several ways. First, when the electrodes make contact, the forward motion of the actuator stops. Second, a change in the current through the servomotor and/or the voltage across the servomotor indicates that the electrodes have come together and the force on them is now rising. Third, while the welding gun is being closed, the welding control applies a low level of power to the welding transformer. As long as the welding electrodes are not touching, the secondary of the welding transformer is open-circuited and no significant current flows in the transformer. When the electrodes do make contact, the current flow in the welding transformer will abruptly increase. Since the welding control is equipped to measure the current in the welding transformer, this abrupt current increase is easy to detect.

The above-mentioned calibration procedure also allows some possible defects or malfunctions in the welding gun itself to be identified. The resistance welding control in FIG. 3 has the capability, by means of primary and secondary sensors, to measure the current and/or voltage in either the primary or secondary, respectively, of the welding transformer. If, when closing the welding gun, the current in the welding transformer rises before the servomotor current rises, this indicates that there is a path for current before the welding electrodes have made contact. This indicates a short-circuit in the welding current circuit, which could be either in the cable between the welding transformer and the welding gun or in the welding gun itself. In either case, an indication of a short-circuit in the welding current path is given by indicator lights.

In addition to measuring the current in the welding transformer, the welding control also has the capability to measure the apparent power factor presented to the powerline at the primary of the welding transformer. If the power factor readings as the welding gun is being closed are compared to upper and lower limits which correspond to the power factor of the welding transformer with an open circuited secondary, a short circuit will load the transformer and cause the power factor to be outside of the upper and lower limits, thus allowing detection of the short circuit. If a short circuit in the welding current circuit is detected, changes in the power factor can be also used to identify where the short circuit is located. If, for example, the short circuit is in the cable between the transformer and welding gun, there will be little or no change in power factor as the welding gun is closed. If, on the other hand, the short circuit is in the welding gun pivot 12 (see FIG. 1), the power factor will change noticeably as the welding gun is closed. This information can be used to assign probabilities to various malfunctions to speed the repair process.

If, during the above-mentioned calibration procedure, the current in the welding transformer never rises, even after the servomotor current rises, this indicates a break in the welding current circuit. This can be caused by a broken cable between the welding transformer and the welding gun, a loose bolted connection, a break in the welding gun, very badly misaligned electrodes, a missing electrode, something jammed in the welding gun, or some sort of electrically non-conductive material on the faces of the welding electrodes, to name just a few possibilities. In any case, an indication of a broken connection in the welding current path is given.

Additional information can be gained by measuring the voltage across the welding electrodes as the welding gun closes. If, for example, significant voltage exists across the welding electrodes, but no significant current flows when the electrodes are closed onto the part to be welded, the problem can be easily identified as some sort of electrically non-conductive contamination on the part or the electrode faces. In another example, if significant transformer current exists without significant voltage across the welding electrodes when they are opened, this is a clear indication of a short-circuit in the welding current circuit.

Once the calibration cycle has established the servomotor actuator's position which corresponds to the fully-closed position of the welding electrodes, this position value is saved in the welding control for use in subsequent operations.

Once the fully-closed position of the welding electrodes is known, the welding control can use this information together with information gathered from the servomotor actuator to detect gaps (also called "poor fit-up") between the sheets of metal to be welded. This is done by closing the welding electrodes at a force considerably lower than the desired welding force, typically 10–20% of desired weld force. Once the welding electrodes close, the welding control measures the position of the servomotor actuator and compares this value to the fully-closed position to obtain the thickness between the welding electrodes. If the thickness is within an acceptable range, no gaps are assumed to exist, the welding force is raised to the desired value, welding current is applied, and the weld is made.

If, on the other hand, a thickness measurement is above an acceptable value, a gap (poor fit-up) between the sheets of metal is assumed and the welding control attempts corrective measures. First, the force on the welding electrodes is raised to its highest possible value and another thickness measurement is taken.

If this value is still above the acceptable value, the problem is either a very persistent gap (poor fit-up) between the sheets of metal or the wrong thickness of metal. To figure out which, the welding control applies a predetermined weld current (usually lower than the regular weld current) for a predetermined time and takes another measurement of metal thickness. If, after current is applied, the metal is still too thick, the welding control can either abort the welding process or select a new welding schedule appropriate to the thickness of metal. If the metal thickness measurement after current is applied is within the acceptable limits, the welding control backs the welding force off to the desired value for this metal thickness, and welding current is applied to make the weld.

If, after raising the force to the maximum value, the thickness measurement reveals a value within the acceptable limits, the welding control backs the welding force off to the desired value for this metal thickness, and welding current is applied to make the weld.

If after closing at reduced force, measurement reveals a thickness that is below the acceptable range, the welding control can do any of several different things.

First, the welding control can abort the welding process and immediately open the welding gun. This would be an appropriate response if the welding gun was mis-positioned so it didn't close on the part to be welded or it closed on the wrong area of the part.

Second, the welding control could use a different weld schedule corresponding to the metal thickness it actually measured.

Third, the welding control could indicate the need to make an additional spotweld next to the one where incorrect metal thickness was detected. This would be an appropriate response if there was any question of the strength of the first weld.

Proper use of the servomotor actuator solves this squeeze time problem and allows detection of excess friction in the welding gun. In the following discussion, it is assumed that the servomotor is driven with a constant current to achieve the stall torque needed for proper force on the welding electrodes after the welding gun has closed.

Figure 2:
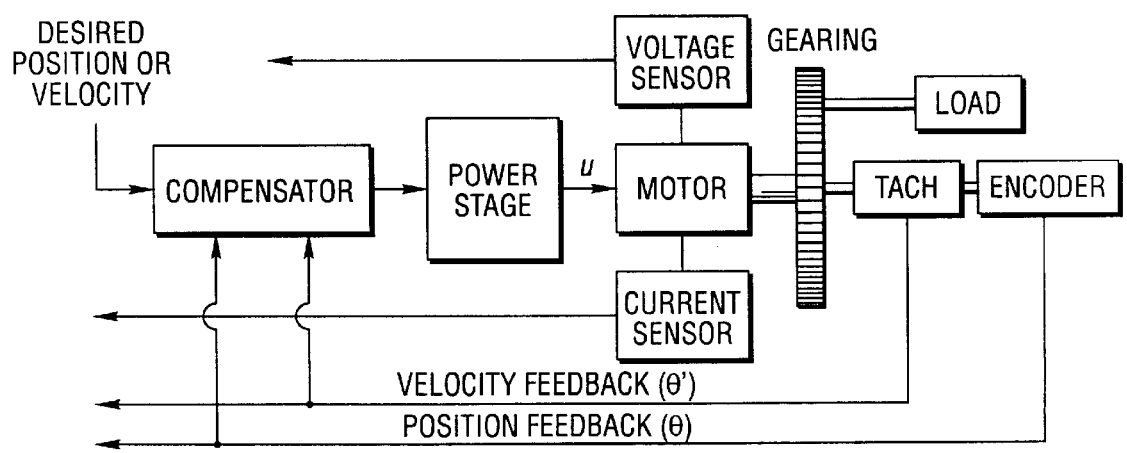
FIG. 2 is a schematic view of a servo system constructed in accordance with the present invention.

Initially, the voltage across the motor will start low and then rise as inertia is overcome and the welding gun motion starts. The friction associated with motion of the welding gun, together with the friction associated with the actuator can be determined by measuring the voltage across the servomotor and the current through it such as by sensors as shown in FIG. 2. The values of friction determined as the welding gun closes can be compared to predetermined values to identify problems in this area.

When the electrodes contact the work and the welding gun stops moving, the voltage across the servomotor will drop as it comes to a stop. This voltage drop can be used as the indication that proper weld force has been achieved and welding current can begin.

If the servomotor is driven with a constant voltage, rather than a constant current, the following two paragraphs should be substituted for the previous two paragraphs:

Initially, the current to the servomotor will start high and then drop as inertia is overcome and the welding gun motion starts. The friction associated with motion of the welding gun, together with the friction associated with the actuator can be determined by measuring the voltage across the servomotor and the current through it. The values of friction determined as the welding gun closes can be compared to predetermined values to identify problems in this area.

When the electrodes contact the work and the welding gun stops moving, the current in the servomotor will increase as it comes to a stop. This current increase can be used as the indication that proper weld force has been achieved and welding current can begin.

Using this method, welding current can be started as soon as proper force on the electrodes is achieved, thus saving time in the production process without introducing variability.

In order to weld certain metals, such as aluminum, it is desirable to start the welding current at a lower force and increase the force on the welding electrodes as the weld is being made. This can be done with the servo drive by starting off at a lower force and then ramping the servomotor drive current upward as needed.

The capability of the servomotor actuator mechanism to measure position can also be used to detect when the metal to be welded has reached softening temperature and electrode indentation has begun. Once electrode indentation into the work starts, the weld has formed and application of welding current past this point will not increase the weld strength significantly. This beginning of indentation can be used as the indication to shut off welding current and keep the welding time to the minimum needed for satisfactory welds.

After the weld is made, it is necessary to keep the welding electrodes clamped on the part for a brief cooling time, called "Hold" time. For some materials, it is desirable to increase the clamping force during hold time to prevent cracks and voids from forming in the weld area as it cools. The ability of the servomotor actuator mechanism to measure position can be used to measure the movement of the welding electrodes during hold time. As the metal cools and shrinks, the electrodes move inward. The inward movement of the electrodes during hold time can be used as the indication of proper cooling of the metal and thus hold time can be made only as long as necessary in order to speed the production process without causing problems with weld cracks and voids.

Particularly on galvanized steel sheet, the welding electrodes will sometimes stick to the part after welding. Sometimes, this causes problems when the welding electrodes get pulled out of their tapered holders as the welding gun opens. This problem can be overcome by using the servomotor actuator to open the welding gun at a moderate force not sufficient to pull the welding electrodes out of their tapered holders. If the welding electrodes do stick, the welding gun will not open and the voltage across the servomotor will not rise as movement starts. In response to this problem, the welding control can apply a short pulse of current to melt the zinc at the face of the electrodes and free them from the work.

When a resistance welding gun is used on a robot, the operation of the robot can be speeded up by using the increase of voltage across the servomotor as the welding gun is opened to detect that the electrodes have ceased touching the part and immediately signaling the robot to begin its motion to the next weld.

In contrast to indirect measurements to infer welding electrode wear, the capability of the servomotor actuator on the welding gun to measure position allows wear on the welding electrodes to be measured more directly. Since welding electrode wear is a gradual phenomena, the averages of many thickness measurements can be used to compute electrode wear. As welding electrodes wear, the average of all thickness measurements will trend downward. Also, if the welding gun is closed without a part between the electrodes, as is done for calibration purposes, the wear of the electrodes can be measured directly by comparing the new calibration position value with the previous one.

With an accurate measurement of welding electrode wear and deterioration, the weld stepper current increase or decrease amount can be based on this more accurate measurement. Also, other welding parameters, such as welding current duration or force applied to the welding electrodes can be adjusted as a function of welding electrode wear to optimize the welding process. This results in decreased process variation.

An accurate measurement of welding electrode wear also allows the welding controller to identify when the wear on the electrodes is excessive and the electrodes need to be replaced. This is usually done by comparing welding electrode wear to a predetermined value and producing an indication when the wear exceeds this value.

In addition, measurements of welding electrode position and movement made possible by the servomotor actuator can be combined with other measurements to identify welding problems and reduce process variation. Positional information from the servo actuator will identify abnormally large electrode movement during a weld. This information can be combined with weld expulsion information to identify damaged welding electrodes which need to be replaced. Other welding problems which damage the welding electrodes can be identified in a similar manner.

In a similar manner, measurements of welding electrode position and movement (indentation into the part) can be used to identify weld expulsion. When weld expulsion occurs, the electrode abruptly moves inward (indents) into the weld. Weld expulsion also causes abrupt shifts in the voltage across the weld and/or the current through the weld and/or the power factor in the primary circuit of the welding transformer. If these electrical signals are examined along with the indentation signal, the reliability of expulsion detection can be improved.

The process of calibrating the servomotor actuator position by closing the welding gun without a part present can also be used to identify when the welding electrodes have been replaced or cleaned and, in response, reset the Weld Stepper. Whenever new welding electrodes are installed, the welding current increase caused by the Weld Stepper needs to be set back to zero. Otherwise, the current would be too high for welding with new electrodes and unsatisfactory welds may result. When the electrodes are cleaned, only part of the weld current increase caused by the weld stepper needs to be canceled.

In most cases, a "Stepper Reset" pushbutton, connected to the welding control, is provided to handle this problem. In one embodiment, the operator presses this button once if the electrodes are cleaned or twice if they are replaced. The welding control responds by either canceling part of the welding current increase due to the weld stepper if the electrodes were cleaned or all the welding current increase due to the weld stepper if the electrodes were replaced. However, if the machine operator forgets to press this button, unsatisfactory welds may result.

These problems can be overcome with the use of position information from the servomotor actuator.

When welding electrodes are replaced, it is necessary to close the welding gun under full force one or two times without a part present in order to "seat" the electrodes into their holders. When this is done, the position sensing capability of the servomotor actuator can be used to sense that the thickness of the welding electrodes has increased. In response, the welding control can either reset the weld stepper automatically or refuse to weld until the operator either resets it manually or replies to a query on the control's data entry panel as illustrated in FIG. 3.

When the welding electrodes are cleaned, material is removed from the electrode faces and the apparent thickness of all following welds takes an abrupt step downward. If the machine operator forgot to press the stepper reset pushbutton, the welding control can use this abrupt drop in weld thicknesses to sound an alert to remind the operator to press the stepper reset pushbutton, or it can automatically set the weld stepper current back to the value required after electrode cleaning.

Although the specific example of a portable resistance spotwelding gun has been used to illustrate the methods of this invention, the methods of this invention apply to any spotwelding machine and associated control means which uses an electric servomotor actuator to close the welding electrodes and apply force to them.

In summary, the various methods of the invention are capable of the following:

1. Using voltage changes at the servomotor to detect that the welding electrodes have contacted either a workpiece to be welded or, in the absence of a workpiece, each other.
2. Energizing the welding transformer at a low power level and using changes in the welding transformer current together with voltage changes at the servomotor to detect that the welding electrodes have contacted either the part to be welded or, in the absence of a part, each other.
3. Energizing the welding transformer at a low power level and using changes in the voltage across the welding electrodes together with voltage changes at the servomotor to detect that the welding electrodes have contacted either the part to be welded or, in the absence of a part, each other.
4. Using current changes at the servomotor to detect that the welding electrodes have contacted either the part to be welded or, in the absence of a part, each other.
5. Energizing the welding transformer at a low power level and using changes in the welding transformer current together with current changes at the servomotor to detect that the welding electrodes have contacted either the part to be welded or, in the absence of a part, each other.
6. Energizing the welding transformer at a low power level and using changes in the voltage across the welding electrodes together with current changes at the servomotor to detect that the welding electrodes have contacted either the part to be welded or, in the absence of a part, each other.
7. Using a combination of voltage and current changes at the servomotor to detect that the welding electrodes have contacted either the part to be welded or, in the absence of a part, each other.
8. Energizing the welding transformer at a low power level and using changes in the welding transformer current together with a combination of voltage and current changes at the servomotor to detect that the welding electrodes have contacted either the part to be welded or, in the absence of a part, each other.
9. Energizing the welding transformer at a low power level and using changes in the voltage across the welding electrodes together with a combination of voltage and current changes at the servomotor to detect that the welding electrodes have contacted either the part to be welded or, in the absence of a part, each other.
10. Using a combination of voltage and current measurements at the servomotor to measure the mechanical friction of the welding machine as the welding electrodes are closed on each other.
11. Using a combination of voltage and current measurements at the servomotor to measure the mechanical friction of the welding machine as the welding electrodes are closed on each other and displaying this value of friction.
12. Using a combination of voltage and current measurements at the servomotor to measure the mechanical friction of the welding machine as the welding electrodes are closed on each other, comparing the values of measured friction to predetermined limits, and producing an error indication when the measured values of friction are outside of the predetermined limits.
13. Using voltage changes at the servomotor to detect that the force on the welding electrodes has reached a desired value.

14. Using voltage changes at the servomotor to detect that the force on the welding electrodes has reached a desired value and, in response, starting the weld current.
15. Using current changes at the servomotor to detect that the force on the welding electrodes has reached a desired value.
16. Using current changes at the servomotor to detect that the force on the welding electrodes has reached a desired value and, in response, starting the weld current.
17. Using a combination of voltage and current changes at the servomotor to detect that the force on the welding electrodes has reached a desired value.
18. Using a combination of voltage and current changes at the servomotor to detect that the force on the welding electrodes has reached a desired value and, in response, starting the weld current.
19. Using the position-sensing abilities of the servomotor actuator to measure the position of the actuator which corresponds to the welding electrodes being fully in contact with each other without anything between them.
20. Using the position-sensing abilities of the servomotor actuator to measure the thickness of the area where a weld is desired.
21. Using the position-sensing abilities of the servomotor actuator to detect gaps between the metal sheets to be welded by measuring the movement of the welding electrodes after they are closed as the force on the welding electrodes is changed.
22. Using the position-sensing abilities of the servomotor actuator to detect gaps between the metal sheets to be welded and, in response, increasing the force on the welding electrodes to close the gaps.
23. Using the position-sensing abilities of the servomotor actuator to detect gaps between the metal sheets to be welded by measuring the movement of the welding electrodes after they are closed as welding current is applied.
24. Using the position-sensing abilities of the servomotor actuator to measure the thickness of the area where a weld is desired and changing the welding parameters as necessary for different thicknesses.
25. Using the position-sensing abilities of the servomotor actuator to measure the thickness of the area where a weld is desired, comparing the thickness measurement to preselected limits, and alerting the operator when a thickness is outside the limits.
26. Using the position-sensing abilities of the servomotor actuator to detect when no metal is between the welding electrodes.
27. Using the position-sensing abilities of the servomotor actuator to measure the wear of the welding electrodes.
28. Using the position-sensing abilities of the servomotor actuator, together with measurements of electrical signals from the welding process to detect welding conditions which damage the welding electrodes.
29. Using the position-sensing abilities of the servomotor actuator to measure welding electrode indentation into the weld area.
30. Using the position-sensing abilities of the servomotor actuator to measure the wear of the welding electrodes and adjusting a weld current stepper according to the measured wear on the welding electrodes.
31. Using the position-sensing abilities of the servomotor actuator to measure the wear of the welding electrodes and changing the weld current magnitude, and/or current duration and/or force applied to the welding electrodes in response to the electrode wear.
32. Using the position-sensing abilities of the servomotor actuator to measure the wear of the welding electrodes and producing an indication when electrode wear exceeds a predetermined limit.
33. Using the position-sensing abilities of the servomotor actuator to measure the thickness of the material being welded, computing a moving average of weld thickness over a number of welds, and using the moving average of weld thickness values to infer the amount of electrode wear.
34. Using the position-sensing abilities of the servomotor actuator to measure the apparent change in the fully-closed position of the welding electrodes caused by electrode replacement.
35. Using the position-sensing abilities of the servomotor actuator to measure the apparent change in the fully-closed position of the welding electrodes caused by electrode replacement and, in response to this change, resetting the weld current stepper.
36. Using the position-sensing abilities of the servomotor actuator to measure the apparent change in the fully-closed position of the welding electrodes caused by electrode replacement and, in response to this change, producing an indication that the weld current stepper needs to be reset.
37. Using the position-sensing abilities of the servomotor actuator to measure the apparent change in the fully-closed position of the welding electrodes caused by electrode cleaning.
38. Using the position-sensing abilities of the servomotor actuator to measure the apparent change in the fully-closed position of the welding electrodes caused by electrode cleaning and, in response to this change, producing an indication that the weld current stepper needs to be reset.
39. Using the position-sensing abilities of the servomotor actuator to measure the apparent change in the fully-closed position of the welding electrodes caused by electrode cleaning and, in response to this change, partially canceling a welding current increase caused by the weld current stepper.
40. Using the position-sensing abilities of the servomotor actuator to verify that the welding electrodes are not making contact with anything, energizing the welding transformer at a low power level and causing an error indication if, while the welding electrodes are not making contact, the current in the welding transformer is above a predetermined value.
41. Using the position-sensing abilities of the servomotor actuator to verify that the welding electrodes are not making contact with anything, energizing the welding transformer at a low power level, measuring the voltage across the welding electrodes and causing an error indication if, while the welding electrodes are not making contact, the current in the welding transformer is above a predetermined value and the voltage across the welding electrodes is below a predetermined value.
42. Using the position-sensing abilities of the servomotor actuator to verify that the welding electrodes are not making contact with anything, activating the servomotor actuator to bring the welding electrodes together, energizing the welding transformer at a low power level and verifying that, before the welding electrodes have made contact, the current in the welding transformer is below a predetermined value.

43. Using the position-sensing abilities of the servomotor actuator to verify that the welding electrodes are not making contact with anything, activating the servomotor actuator to bring the welding electrodes together, energizing the welding transformer at a low power level, measuring the voltage across the welding electrodes and verifying that, before the welding electrodes have made contact, the current in the welding transformer is below a predetermined value and the voltage across the welding electrodes is above a predetermined value.

44. Using the position-sensing abilities of the servomotor actuator to verify that the welding electrodes are not making contact with anything, activating the servomotor actuator to bring the welding electrodes together, energizing the welding transformer at a low power level and causing an error indication if, before the welding electrodes have made contact, the current in the welding transformer is above a predetermined value.

45. Thereafter using measurements of changes in the power factor in the primary circuit of the welding transformer in order to infer the location of a short circuit which is causing the current in the welding transformer to be above the predetermined value.

46. Using the position-sensing abilities of the servomotor actuator to verify that the welding electrodes are not making contact with anything, activating the servomotor actuator to bring the welding electrodes together, energizing the welding transformer at a low power level and causing an error indication if, before the welding electrodes have made contact, the voltage across the welding electrodes is below a predetermined value.

47. Thereafter using measurements of changes in the power factor in the primary circuit of the welding transformer in order to infer the location of a short circuit which is causing the voltage across the welding electrodes to be below the predetermined value.

48. Using the position-sensing abilities of the servomotor actuator to verify that the welding electrodes are not making contact with anything, activating the servomotor actuator to bring the welding electrodes together, energizing the welding transformer at a low power level, measuring the voltage across the welding electrodes and causing an error indication if, before the welding electrodes have made contact, the current in the welding transformer is above a predetermined value and the voltage across the welding electrodes is below a predetermined value.

49. Thereafter using measurements of changes in the power factor in the primary circuit of the welding transformer in order to infer the location of a short circuit which is causing the current in the welding transformer to be above the predetermined value and the voltage across the welding electrodes to be below the predetermined value.

50. Using the position-sensing abilities of the servomotor actuator to verify that the welding electrodes are not making contact with anything, activating the servomotor actuator to bring the welding electrodes together, energizing the welding transformer at a low power level and causing an error indication if, before the welding electrodes have made contact, the power factor, as measured in the primary of the welding transformer, is outside of predetermined upper and lower limits.

51. Thereafter using measurements of changes in the power factor in the primary circuit of the welding transformer in order to infer the location of a short circuit which is causing the power factor in the primary circuit of the welding transformer to be outside of the predetermined upper and lower limits.

52. Using the position-sensing abilities of the servomotor actuator to verify that the welding electrodes are not making contact with anything, activating the servomotor actuator to bring the welding electrodes together, energizing the welding transformer at a low power level and causing an error indication if, after the welding electrodes have made contact, the current in the welding transformer is not above a predetermined value.

53. Using the position-sensing abilities of the servomotor actuator to verify that the welding electrodes are not making contact with anything, activating the servomotor actuator to bring the welding electrodes together, energizing the welding transformer at a low power level, measuring the voltage across the welding electrodes and causing an error indication if, after the welding electrodes have made contact, the current in the welding transformer is not above a predetermined value or the voltage across the welding electrodes is not below a predetermined value.

54. Using the position-sensing abilities of the servomotor actuator to measure indentation of the welding electrodes into the work when a weld is made.

55. Using the position-sensing abilities of the servomotor actuator to measure the indentation of the welding electrodes into the work as welding current is applied and terminating the welding current when sufficient indentation has taken place.

56. Using the position-sensing abilities of the servomotor actuator to measure the indentation of the welding electrodes into the work when a weld is made, measuring the electrical signals associated with the welding current and terminating the weld current in response to the indentation and the electrical signals.

57. Using the position-sensing abilities of the servomotor actuator to measure the indentation of the welding electrodes into the work as welding current is applied and using the indentation measurement to identify weld expulsion.

58. Using the position-sensing abilities of the servomotor actuator to measure the indentation of the welding electrodes into the work as welding current is applied, measuring the electrical signals associated with the welding current and using the measured values of the indentation and the electrical signals together to identify weld expulsion.

59. Using the position-sensing abilities of the servomotor actuator to measure the indentation of the welding electrodes into the work after welding current is applied and using a measure of indentation to decide when to release the welding electrodes from the weld.

60. Using the position-sensing abilities of the servomotor actuator as the welding electrodes are being removed from the workpiece to detect that the welding electrodes have stuck to the workpiece.

61. Using changes in the voltage at the servomotor as the welding electrodes are being removed from the workpiece after welding to detect that the welding electrodes have stuck to the workpiece.

62. Using changes in the current at the servomotor as the welding electrodes are being removed from the workpiece after welding to detect that the welding electrodes have stuck to the workpiece.

63. Using changes in the relationship between voltage and current at the servomotor as the welding electrodes are being removed from the workpiece after welding to detect that the welding electrodes have stuck to the workpiece.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a resistance spot welding system including a welding transformer, a welding machine, one or more welding electrodes supported for movement by the welding machine, and an electric servomotor actuator adapted to receive electrical inputs to move the one or more welding electrodes and apply a force to the one or more welding electrodes, a method for determining a condition of the system or a workpiece in the system, the method comprising:

sensing position of the servomotor actuator and providing a feedback signal in response thereto;

energizing the welding transformer;

measuring one or more parameters of energy flowing in the welding transformer; and processing the feedback signal together with one or more measured parameters of the energy flowing in the welding transformer to determine the condition.

2. The method as claimed in claim 1 wherein the condition is the position of the servomotor actuator which corresponds to the welding electrodes being fully in contact with each other without a workpiece between them.

3. The method as claimed in claim 1 further comprising positioning at least one workpiece between the welding electrodes and wherein the condition is thickness of an area where a weld is desired on the workpiece.

4. The method as claimed in claim 3 further comprising changing welding parameters of the system based on the thicknesses.

5. The method as claimed in claim 3 further comprising comparing the thickness to predetermined limits and alerting an operator of the system when the thickness is outside the predetermined limits.

6. The method as claimed in claim 1 further comprising positioning workpieces between the welding electrodes and increasing the force on the welding electrodes and wherein the condition is at least one gap between the workpieces and wherein the steps of sensing and processing are also performed to measure movement of the servomotor actuator after the welding electrodes are closed and after the force on the welding electrodes is changed.

7. The method as claimed in claim 6 further comprising further increasing the force on the welding electrodes to close the at least one gap.

8. The method as claimed in claim 6 wherein current is applied to the workpieces before a weld is attempted in order to close the at least one gap between the workpieces.

9. The method as claimed in claim 1 further comprising positioning at least one workpiece between the welding electrodes and applying welding current to the welding electrodes and wherein the steps of sensing and processing are performed as the welding current is applied.

10. The method as claimed in claim 1 wherein the condition is the absence of a workpiece between the welding electrodes.

11. The method as claimed in claim 1 wherein the condition is wear of the welding electrodes.

12. The method as claimed in claim 11 further comprising adjusting a weld current stepper based on the wear.

13. The method as claimed in claim 11 further comprising changing weld current magnitude based on wear.

14. The method as claimed in claim 11 further comprising changing weld current duration based on the wear.

15. The method as claimed in claim 11 further comprising changing force applied to the welding electrodes based on the wear.

16. The method as claimed in claim 11 further comprising producing an indication when the wear exceeds a predetermined limit.

17. The method as claimed in claim 1 wherein the condition is a welding condition which may damage at least one welding electrode and wherein the method further comprises aborting the weld process and/or indicating that the at least one welding electrode should be inspected for damage.

18. The method as claimed in claim 1 further comprising positioning a workpiece between the welding electrodes and applying a welding current to the welding electrodes to form a weld wherein the condition is welding electrode indentation into the weld.

19. The method as claimed in claim 1 wherein the condition is wear of at least one welding electrode and wherein the method further comprises positioning a workpiece between the welding electrodes, applying a welding current to the welding electrodes to form a weld on the workpiece at a location, moving the at least one welding electrode relative to the workpiece to subsequent locations on the workpiece, applying a welding current to the welding electrodes to form a weld at the subsequent locations, performing the steps of sensing and processing to obtain a thickness at each weld location, computing a moving average of the weld thicknesses and using the moving average of weld thicknesses to infer an amount of wear of the at least one welding electrode.

20. The method as claimed in claim 1 wherein the condition is apparent change in a fully closed position of the welding electrodes.

21. The method as claimed in claim 20 wherein the condition is apparent change in the fully closed position of the welding electrodes caused by electrode replacement.

22. The method as claimed in claim 21 further comprising resetting a weld current stepper based on the apparent change.

23. The method as claimed in claim 21 further comprising producing an indication that a weld current stepper needs to be reset based on the apparent change.

24. The method as claimed in claim 20 wherein the condition is apparent change in the fully closed position of the welding electrodes caused by electrode cleaning.

25. The method as claimed in claim 24 further comprising producing an indication that a weld current stepper needs to be reset based on the apparent change.

26. The method as claimed in claim 24 further comprising partially canceling a welding current increase caused by a weld current stepper based on the apparent change.

27. The method as claimed in claim 1 wherein the condition is that at least one welding electrode is not making electrical contact to complete the welding current circuit.

28. The method as claimed in claim 27 further comprising causing an error indication if, while the at least one welding electrode is not making contact with the workpiece, current in the welding transformer is above a first predetermined value.

29. The method as claimed in claim 27 further comprising measuring voltage across the welding electrodes and causing an error indication if, while the welding electrodes are not making contact with the workpiece, current in the welding transformer is above a first predetermined value and voltage across the welding electrodes is below a second predetermined value.

30. The method as claimed in claim 27 further comprising activating the servomotor actuator to bring the welding electrodes together.

31. The method as claimed in claim 30 further comprising verifying that, before the welding electrodes make contact with the workpiece, current in the welding transformer is below a third predetermined value.

32. The method as claimed in claim 30 further comprising measuring the voltage across the welding electrodes and verifying that, before the welding electrodes make contact with the workpiece, current in the welding transformer is below a third predetermined value and the voltage across the welding electrodes is above a fourth predetermined value.

33. The method as claimed in claim 30 further comprising causing an error indication if, before the welding electrodes make contact with the workpiece, current in the welding transformer is above a first predetermined value.

34. The method as claimed in claim 33 further comprising measuring changes of power factor in a primary circuit of the welding transformer to obtain measurements and utilizing the measurements to infer location of a short circuit which causes the current in the welding transformer to be above the first predetermined value.

35. The method as claimed in claim 30 further comprising causing an error indication if, before the welding electrodes make contact with the workpiece, voltage across the welding electrodes is below a second predetermined value.

36. The method as claimed in claim 35 further comprising measuring changes of power factor in a primary circuit of the welding transformer to obtain measurements and utilizing the measurements to infer location of a short circuit which causes the voltage across the welding electrodes to be below the second predetermined value.

37. The method as claimed in claim 30 further comprising measuring the voltage across the welding electrodes to obtain a voltage measurement and causing an error indication if, before the welding electrodes have made contact with the workpiece, current in the welding transformer is above a first predetermined value and the voltage measurement is below a second predetermined value.

38. The method as claimed in claim 37 further comprising measuring changes of power factor in a primary circuit of the welding transformer to obtain measurements and utilizing the measurements to infer location of a short circuit which causes the current in the welding transformer to be above the first predetermined value and the voltage measurement to be below the second predetermined value.

39. The method as claimed in claim 30 further comprising measuring power factor in a primary circuit of the welding transformer to obtain a measurement and causing an error indication if, before the welding electrodes have made contact with the workpiece, the measurement is outside predetermined upper and lower limits.

40. The method as claimed in claim 39 further comprising utilizing the measurement to infer location of a short circuit which causes the power factor in the primary circuit of the welding transformer to be outside of the predetermined upper and lower limits.

41. The method as claimed in claim 30 further comprising causing an error indication if, after the welding electrodes have made contact with the workpiece, current in the welding transformer is not above a predetermined value.

42. The method as claimed in claim 30 further comprising measuring voltage across the welding electrodes to obtain a voltage measurement and causing an error indication if, after the welding electrodes have made contact with the workpiece, the current in the welding transformer is not above a predetermined value or the voltage measurement is not below a predetermined value.

43. The method as claimed in claim 1 further comprising positioning a workpiece between the welding electrodes and applying a welding current to the welding electrodes to make a weld to the workpiece and wherein the steps of sensing and processing are performed to determine indentation of the welding electrodes into the workpiece during application of the welding current.

44. The method as claimed in claim 43 further comprising terminating the welding current based on the indentation.

45. The method as claimed in claim 43 further comprising measuring electrical signals based on the welding current during application of the welding current and terminating the weld current based on the indentation and the electrical signals.

46. The method as claimed in claim 43 further comprising identifying weld expulsion based on the indentation.

47. The method as claimed in claim 43 further comprising measuring electrical signals based on welding current during application of the welding current and identifying weld expulsion based on indentation and the electrical signals.

48. The method as claimed in claim 43 further comprising determining when to release the welding electrodes from the weld based on the indentation.

49. The method as claimed in claim 1 further comprising positioning the workpiece between the welding electrodes and applying a welding current to the welding electrodes and wherein the steps of sensing and processing are performed to determine the condition in which the welding electrodes have stuck to the workpiece as the welding electrodes are being removed from the workpiece after application of the welding current.

* * * * *